(12) United States Patent
Li et al.

(10) Patent No.: US 8,724,653 B2
(45) Date of Patent: May 13, 2014

(54) DOWNLINK TRANSMISSION METHOD AND ENODEB IN MULTIPLE INPUT MULTIPLE OUTPUT SYSTEM

(75) Inventors: Bin Li, Shenzhen (CN); Zhaohua Zeng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 13/639,870

(22) PCT Filed: Oct. 15, 2010

(86) PCT No.: PCT/CN2010/077786
§ 371 (c)(1),
(2), (4) Date: Oct. 8, 2012

(87) PCT Pub. No.: WO2011/140782
PCT Pub. Date: Nov. 17, 2011

(65) Prior Publication Data
US 2013/0039234 A1     Feb. 14, 2013

(30) Foreign Application Priority Data

May 11, 2010 (CN) .......................... 2010 1 0169502

(51) Int. Cl.
*H04J 3/00*   (2006.01)
*H04J 3/16*   (2006.01)
(52) U.S. Cl.
CPC ........................................ *H04J 3/16* (2013.01)
USPC ........................................ 370/464; 370/310.2
(58) Field of Classification Search
CPC .......................................................... H04J 3/16
USPC .......................... 370/310.2, 328, 38, 431, 464
See application file for complete search history.

(56) References Cited

U.S. PATENT DOCUMENTS 8,208,855 B2 *  6/2012  Lee et al. ...................... 455/63.1
8,611,244 B2 * 12/2013  Zhang et al. ................... 370/252
(Continued)

FOREIGN PATENT DOCUMENTS

CN        1653721 A      8/2005
CN      101536359 A      9/2009
(Continued)

OTHER PUBLICATIONS

International Search Report in international application No. PCT/CN2010/077786, mailed on Feb. 10, 2011.
(Continued)

*Primary Examiner* — Brenda H Pham
(74) *Attorney, Agent, or Firm* — Oppedahl Patent Law Firm LLC

(57) ABSTRACT

The disclosure provides a downlink transmission method and an eNodeB in a multiple input multiple output system. The method includes: obtaining channel quality indication of a User Equipment (UE) to generate a channel condition indication value; obtaining channel rank indication of the UE to generate a channel correlation indication value; obtaining uplink channel impulse response estimation data of the UE to generate a channel variation state indication value; selecting a downlink transmission mode according to the channel condition indication value, the channel correlation indication value and the channel variation state indication value; transmitting data to the UE in the selected downlink transmission mode. Because of extracting information from a current channel as a basis of a subsequent selection of the downlink mode, the disclosure can greatly improve a resource utilization ratio of a system and realize a better wireless transmission effect.

12 Claims, 4 Drawing Sheets

(56) References Cited

U.S. PATENT DOCUMENTS

2003/0161282 A1    8/2003  Medvedev
2008/0056414 A1    3/2008  Kim
2010/0075672 A1*   3/2010  Jwa et al. .................. 455/434
2012/0057538 A1*   3/2012  Adhikari et al. ............ 370/329

FOREIGN PATENT DOCUMENTS

| CN | 101630966 A   | 1/2010 |
| JP | 2008533869 A  | 8/2008 |
| JP | 2009111781 A  | 5/2009 |
| JP | 2009111926 A  | 5/2009 |
| KR | 20080021494 A | 3/2008 |

OTHER PUBLICATIONS

English Translation of the Written Opinion of the International Search Authority in international application No. PCT/CN2010/077786, mailed on Feb. 10, 2011.
Physical layer procedures Mar. 2009.
3rd Generation Partnership Project (3GPP), Technical Specification Group Radio Access Network, Evolved Universal Terrestrial Radio Access (E-UTRA), Physical layer procedures, Dec. 2008.

* cited by examiner

DOWNLINK TRANSMISSION METHOD AND ENODEB IN MULTIPLE INPUT MULTIPLE OUTPUT SYSTEM

TECHNICAL FIELD

The disclosure relates to the field of communication, and in particular to a downlink transmission method and an eNodeB in a multiple input multiple output system.

BACKGROUND

A Long Term Evolution (LTE) wireless communication system is a new generation wireless network based on an Orthogonal Frequency Division Multiplexing (OFDM) technology, at a wireless side of which technologies such as Multiple Input Multiple Output (MIMO), high order modulation and corresponding frequency selection scheduling, power control and the like are adopted to cooperate, in order to achieve a higher system throughput and spectrum efficiency.

In an LTE system, the MIMO is regarded as an optimal technology to meet requirements of a user mean throughput and spectrum efficiency. In order to achieve the target, it is specified in the LTE system that, in different wireless channel environments, solutions including linear spatial pre-coding, beam forming, transmit diversity and the like can be self-adaptively selected through the MIMO technology.

The linear spatial pre-coding means that: when there are multiple transmitting antennas at a transmitting end, multiple data streams can be mapped to the multiple antennas through one linear pre-coding operation. A User Equipment (UE) generates a pre-coding vector according to an estimation of downlink spatial channel characteristics, and feeds it to an eNodeB side through an uplink control channel. The principle thereof is mainly that transmitting signals are located on a corresponding orthogonal basis of the channel matrix by pre-coding a matrix, and a main working mechanism thereof is that different data streams are transferred in a plurality of independent spatial channels to improve a peak rate of data transmission.

The main principle of the beam forming technology is to utilize a strong correlation among spatial channels and utilize an interference principle of a wave to generate a strongly directional radiation pattern, so that a main lobe of the radiation pattern is self-adaptively directed to a direction of a incoming wave of a user, as a result, a signal to noise ratio is increased and a system capacity or coverage is increased. The main principle of the transmit diversity is to utilize a weak correlation among the spatial channels and combine selectivity in terms of time/frequency to improve reliability of signal transmission based on a diversity gain, thereby improving the signal to noise ratio of a received signal.

The LTE system is configured with a plurality of UE Down Link (UE DL) transmission modes, different transmission modes can be selected to increase its own coverage and capacity, and each transmission mode respectively corresponds to a corresponding wireless transmission manner. In a region with a low signal to noise ratio, the transmit diversity technology and the beam forming technology can be utilized to effectively increase the signal to noise ratio of a received signal, so as to increase a transmission speed or a coverage; while in a region with a high signal to noise ratio, a transmission speed cannot be improved obviously any more by further increasing the signal to noise ratio, and the spatial multiplexing technology can be utilized to increase a data transmission speed without increasing a bandwidth.

Since there are the multiple UE DL transmission modes and a transmission technology corresponding to each transmission mode has pertinence, in a current LTE system, when a wireless environment is changed, a downlink transmission mode cannot be adjusted in real time and thus a resource utilization ratio is lower.

SUMMARY

The purpose of the disclosure is to provide a downlink transmission method and an eNodeB in a multiple input multiple output system, which can solve the problem that when a wireless environment is changed a downlink transmission mode cannot be adjusted in real time and thus a resource utilization ratio is lower.

According to one aspect of the disclosure, a downlink transmission method in a multiple input multiple output system is provided, which includes that: Channel Quality Indication (CQI) information of a User Equipment (UE) is obtained to generate a channel condition indication value; channel Rank Indication (RI) information of the UE is obtained to generate a channel correlation indication value; uplink Channel Impulse Response (CIR) estimation data of the UE is obtained to generate a channel variation state indication value; a downlink transmission mode is selected according to the channel condition indication value, the channel correlation indication value and the channel variation state indication value; and data is transmitted to the UE in the selected downlink transmission mode.

According to another aspect of the disclosure, an eNodeB in a multiple input multiple output system is further provided, which includes: an obtaining unit, configured to obtain CQI, channel RI and uplink CIR estimation data of a UE; a first selection unit, including: a first module, configured to obtain the CQI of the UE to generate a channel condition indication value; a second module, configured to obtain the channel RI of the UE to generate a channel correlation indication value; a third module, configured to obtain the CIR estimation data of the UE to generate a channel variation state indication value; and a fourth module, configured to select the downlink transmission mode according to the channel condition indication value, the channel correlation indication value and the channel variation state indication value; and a sending unit, configured to transmit data to the UE in the selected downlink transmission mode.

Since information is obtained from a current channel as a basis of a subsequent selection of a downlink mode, the problem that when a wireless environment is changed a downlink transmission mode cannot be adjusted in real time and thus a resource utilization ratio is lower is overcome to further achieve the following technical effects:

1. CQI, channel RI and CIR estimation data of a UE are utilized to generate the corresponding indication values, and a downlink transmission mode is selected according to the indication values, such that a bandwidth and a resource utilization ratio of a system are increased;

2. a downlink transmission mode is selected according to the channel RI, the CIR and a TDD characteristic of a system, such that the bandwidth and the resource utilization ratio of the system are increased; and 3. a downlink transmission mode is selected according to RI, CIR and an FDD characteristic of a system and a Multi-User Multiple Input Multiple Output (MU-MIMO) criterion, such that a bandwidth and a resource utilization ratio of the system are increased.

BRIEF DESCRIPTION OF THE DRAWINGS

The drawings are provided for further understanding of the disclosure and form a part of the subject application; and exemplary embodiments of the disclosure and the description thereof are used for explaining the disclosure and are not intended to form any improper limit for the disclosure. In the drawings.

DETAILED DESCRIPTION

Figure 1:
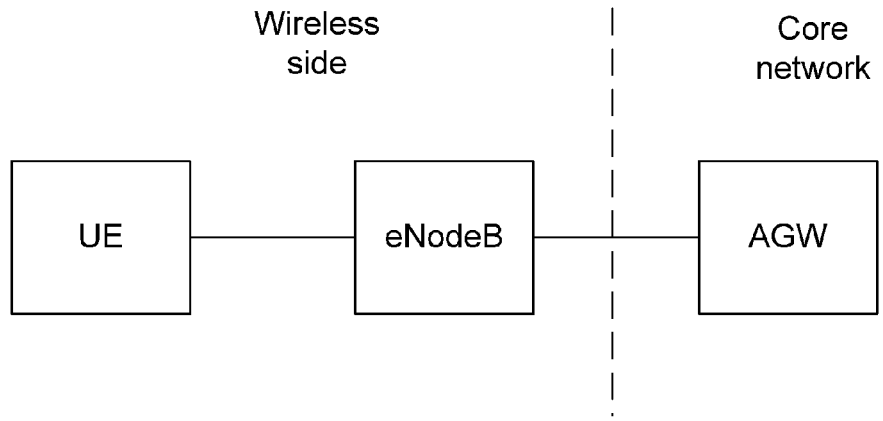
FIG. 1 shows a structure diagram of a wireless side of an LTE network structure.

The disclosure will be described in detail in combination with the drawings and embodiments hereinafter. The disclosure can be applied to a multiple input multiple output system, such as an LTE system or a similar system. The LTE system has a plurality of structures; with reference to a structure diagram of a wireless side of an LTE network structure as shown in FIG. 1, an eNodeB transmits data from the gateway (AGW) of a core network to a UE.

The eNodeB can realize transmission technologies corresponding to various downlink transmission modes. According to the 3GPP Release 8 protocol, there are total seven DownLink (DL) transmission modes from 1 to 7 in terms of serial number, and each downlink transmission mode has a corresponding wireless multi-antenna transmission technology. In the disclosure, through a parameter of a current wireless environment, a downlink transmission mode is selected in real time to transmit data to a user. Each embodiment of the disclosure will be described in details hereinafter. First, embodiment 1 of the disclosure will be described.

Figure 2:
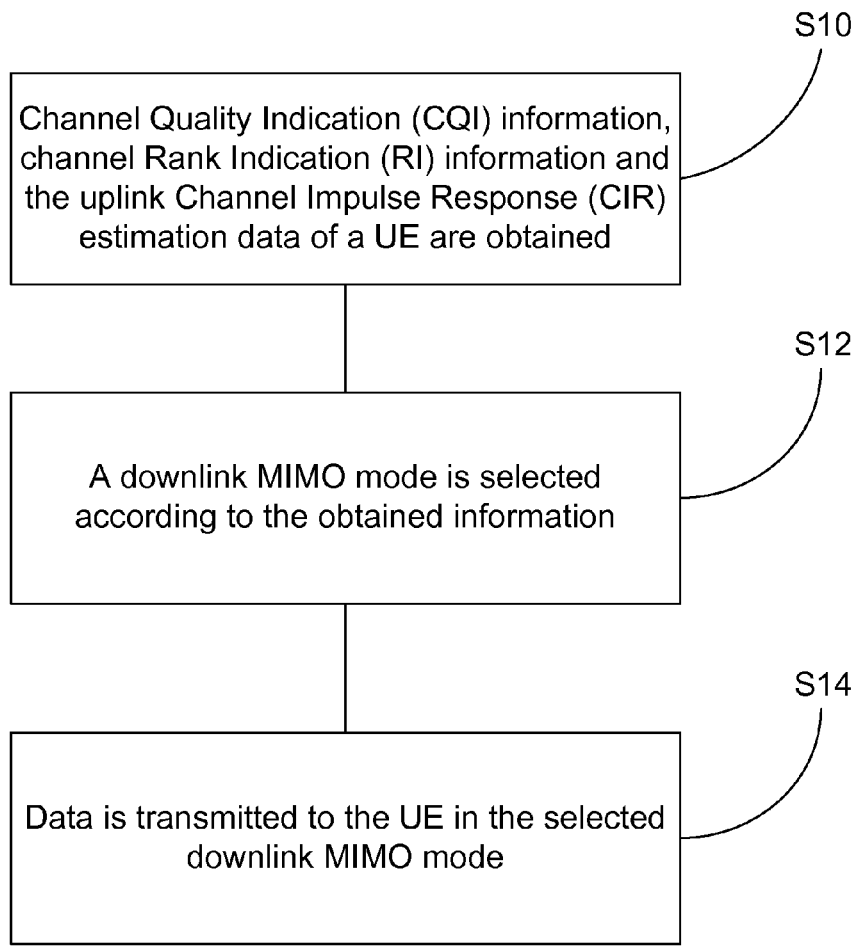
FIG. 2 shows a flow diagram of embodiment 1.

With reference to a flow diagram of the embodiment 1 as shown in FIG. 2, the process includes the following steps that:

S10: CQI information, channel RI information and uplink CIR estimation data of a UE are obtained;

S12: a downlink transmission mode is selected according to the obtained information; and S14: data is transmitted to the UE in the selected downlink transmission mode.

According to the all obtained information, a downlink transmission mode is selected by an equipment at an eNodeB or a core network side, and data is transmitted to the UE in the selected downlink transmission mode. As the downlink transmission mode can be selected according to information in a wireless channel, the selected downlink transmission mode is most suitable for a current wireless environment, a resource utilization ratio of the wireless channel can be increased, and transmission quantity of data can be increased.

Figure 3:
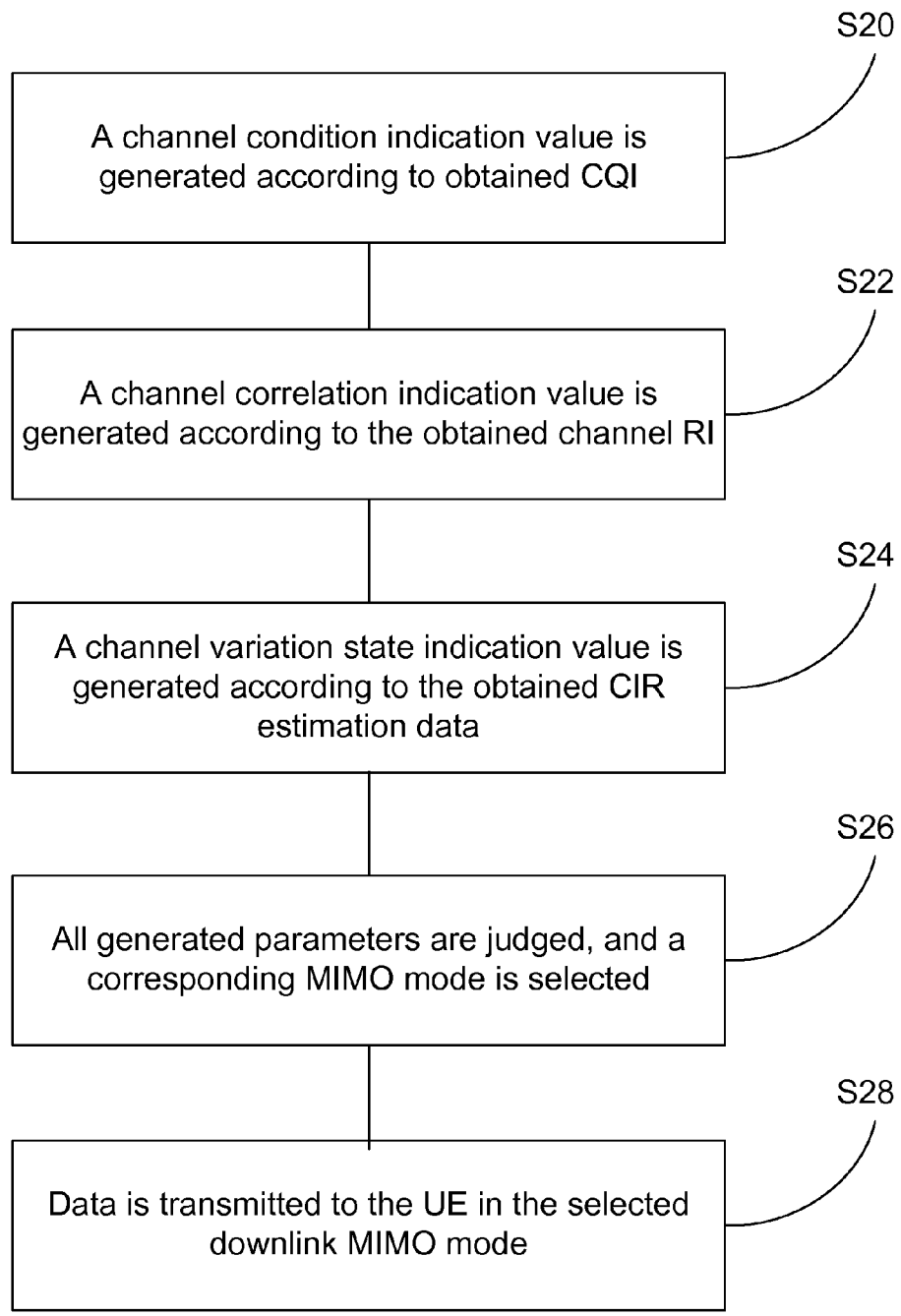
FIG. 3 shows a flow diagram of embodiment 2.

Multiple indication values can be generated according to the obtained information in the wireless channel to indicate the current channel environment. A process of selection of a downlink transmission mode according to the indication values will be described in conjunction with embodiment 2 hereinafter. With reference to a flow diagram of the embodiment 2 as shown in FIG. 3, the process includes the following steps.

S20: a channel condition indication value flag$^{CQI}$ is generated according to obtained CQI.

The channel condition indication value flag$^{CQI}$ is used as the basis of the subsequent selection of the downlink transmission mode.

A process of generation of the indication values can refer to formula (1) and formula (2):

$$CQI_k = E\left\{\min_{1 \le m \le M}(CQI_1(m), CQI_2(m))\right\} \tag{1}$$

where, $CQI_k$ is a mean value CQI of the K-th UE.

CQIs are obtained from the UE, and are reported to the eNodeB by the UE, or the UE is triggered by the eNodeB to report the CQIs. Total M groups of the CQIs reported by the UE for M times are obtained by the eNodeB. In each group of the CQIs, two CQIs are respectively $CQI_1$ and $CQI_2$, the minimum CQI in each group is selected to obtain total M minimum CQIs, a mean value CQI is calculated, the mean value CQI is compared with a preset threshold CQI_Thr, and a channel condition indication value flag$^{CQI}$(k) of the K-th UE is obtained through the following formula.

$$flag^{CQI}(k) = \begin{cases} 1 & CQI_k > \text{CQI\_Thr} \\ 0 & CQI_k \le \text{CQI\_Thr} \end{cases} \tag{2}$$

It is judged whether the mean value CQI is greater than the preset threshold CQI_Thr; if the mean value CQI is greater than the preset threshold CQI_Thr, a first channel condition indication value of 1 is generated; if the mean value CQI is less than or equal to the preset threshold CQI_Thr, a second channel condition indication value of 0 is generated.

Wherein, M is an integer greater than 0, preferably, an integer within 10; the preset threshold can be set according to a channel condition, for example, set within 8.

Moreover, when CQI is a single stream, that is, just one piece of CQI information is received, at this moment, the other CQI is set as the maximum value to thereby select the received CQI information; for example, when the received $CQI_1$ is 4, the $CQI_2$ is set as the maximum value 16 to thereby select the received $CQI_1$.

S22: a channel correlation indication value is generated according to the obtained channel RI.

The channel correlation indication value flag$^{RI}$ is used as the basis of the subsequent selection of the downlink transmission mode.

The steps of obtaining the channel correlation indication value flag$^{RI}$ of each UE are as follows: if a UE is in a downlink transmission mode 3 or mode 4, RIs reported by each UE within time T1 are collected, at the beginning of each time window, at an initial stage, Num$_{RI}$=0, the value of the RI ranks from 1 to 4 according to a regulation in the protocol, when a eNodeB side receives RI=1 fed by a UE k, the number of times of RI=1 is recorded, and Num$^k_{RI=1}$=Num$^k_{RI=1}$+1 exists; similarly, the number of times of the RI=2, 3 or 4 is recorded. The probability of the RI is calculated through formula (3):

$$P^k_{RI=1} = \frac{Num^k_{RI=1}}{Num^k_{total\_RI}} \tag{3}$$

$$P^k_{RI \ge 2} = \frac{Num^k_{total\_RI} - Num^k_{RI=1}}{Num^k_{total\_RI}}$$

where, Num$^k_{total\_RI}$ is respectively the total number of times of the RI fed by the k-th UE within the time window T1, Num$^k_{RI=1}$ is the number of times of RI=1 fed by the UE, $P^k_{RI=1}$ is the probability of RI=1 fed by the k-th UE, $P^k_{RI \ge 2}$ is the probability of other RI value except RI=1 fed by the k-th UE, i.e., the probability of RI=2, 3 and 4.

The calculated probability is compared with a preset threshold RI_Thr, a channel correlation indication value flag$^{RI}$ is generated through formula (4) according to the result of a comparison:

$$flag^{RI}(k) = \begin{cases} 1 & P^k_{RI=1} > RI\_Thr \\ 2 & P^k_{RI=2} > RI\_Thr \\ 0 & \text{otherwise} \end{cases} \quad (4)$$

when the probability $P^k_{RI=1}$ of RI=1 fed by the k-th UE is greater than the preset threshold RI_Thr, a first channel correlation indication value of 1 is generated; when the probability $P^k_{RI\ne2}$ of other RI value except RI=1 fed by the k-th UE is greater than the preset threshold RI_Thr, a second channel correlation indication value of 2 is generated; in other situations, a third channel correlation indication value of 0 is generated. The RI decision threshold RI_Thr can be set according to a channel situation, for example, set between 0.5 and 0.8.

S24: a channel variation state indication value is generated according to the obtained CIR estimation data.

The channel variation state indication value flag$^{CIR}$ is used as the basis of the subsequent selection of the downlink transmission mode.

For each UE, uplink channel impulse response estimation data of each user is respectively collected within a preset time T. Wherein, the uplink channel impulse response estimation data of the k-UE processed during passing the channel in the time slot t is expressed by a matrix as shown in formula (5):

$$H^{(k)}_{t\,Ka\times L} = \begin{bmatrix} h^{(k,1)}_1(t) & h^{(k,1)}_2(t) & \cdots & h^{(k,1)}_L(t) \\ h^{(k,2)}_1(t) & h^{(k,2)}_2(t) & \cdots & h^{(k,2)}_L(t) \\ \vdots & \vdots & \ddots & \vdots \\ h^{(k,Ka)}_1(t) & h^{(k,Ka)}_2(t) & \cdots & h^{(k,Ka)}_L(t) \end{bmatrix}_{Ka\times L} \quad (5)$$

where, Ka is the number of antennas in an eNodeB array, L is the number of a Resource Element (RE) occupied by the k-th UE within a bandwidth of an LTE system, and $h_L$ is the uplink channel impulse response estimation data.

For an LTE system, the estimation data shown in the formula (5) can be obtained from an uplink DeModulation Reference Signal (DMRS) or an uplink Sounding Reference Signal (SRS). Within a time window $T_{up}$, for different uplink time slots t1 and t2, the corresponding uplink channel impulse response estimation data $H_{t1}$ and $H_{t2}$ are respectively obtained, and a correlation between CIR data on the corresponding frequency domain locations is calculated according to a formula as shown in formula (6):

$$R_H(k) = \frac{1}{L'} \sum_{i=1}^{L'} \left| \frac{\sum_{ka=1}^{Ka} h^{(k,ka)}_i(t1) \cdot conj\left(h^{(k,ka)}_i(t2)\right)}{\sqrt{\sum_{ka=1}^{Ka} |h^{(k,ka)}_i(t1)|^2 * \sum_{ka=1}^{Ka} |h^{(k,ka)}_i(t2)|^2}} \right| \quad (6)$$

where, the time interval between t1 and t2 is required to meet $t2-t1 \le T_{up}$, that is, the time interval between t1 and t2 is less than or equal to the time of an uplink related time window, where $T_{up}$ is a time length of the uplink related time window; in the formula, i=1, 2, ..., L', L' is the number of the RE occupied by the k-th user on the same frequency domain location in different time slots before and after, $1 \le L' \le L$, and $R_H(k)$ is an instant correlation value.

A smoothing filtering is performed through formula (7) for the instant correlation value $R_H$ obtained in the formula (6) and a recorded history correlation value $\overline{R}_k$ of the uplink adjacent time slot channel estimation data for the k-th UE, to update the history correlation value $\overline{R}_k$:

$$\overline{R}_k = (1-\alpha)\overline{R}_k + \alpha R_H(k) \quad (7)$$

The updated history correlation value $\overline{R}_k$, i.e., the correlation value $\overline{R}$ of the k-th UE, is obtained. Wherein, α is a smoothing filtering factor, and α is greater than 0 and less than or equal to 1; when L' in the formula (6) is equal to 0, the formula (7) becomes $R_H(k) = \overline{R}_k$. That is, the formula (6) is adopted when the instant correlation value $R_H(k)$ is equal to the history value $\overline{R}_k$ and L' is not equal to 0.

The updated history correlation value $\overline{R}_k$ is compared with a preset threshold CIR_Thr, and a compared channel variation state indication value flag$_{CIR}$ is obtained according to formula (8):

$$flag^{CIR}(k) = \begin{cases} 1 & \overline{R}_k \le CIR\_Thr \\ 0 & \overline{R}_k > CIR\_Thr \end{cases} \quad (8)$$

It is judged whether the updated history correlation value $\overline{R}_k$ is greater than the preset threshold CIR_Thr; if the updated history correlation value $\overline{R}_k$ is less than or equal to the preset threshold CIR_Thr, a first channel variation state indication value of 1 is generated; if the updated history correlation value $\overline{R}_k$ is greater than the preset threshold CIR_Thr, a second channel variation state indication value of 0 is generated.

Preferably, the decision threshold CIR_Thr of the updated history correlation value $\overline{R}_k$ ranks from 0.2 to 0.9.

S26: all generated parameters are judged, and a corresponding downlink transmission mode is selected.

When flag$^{RI}$(k)≠1 && flag$^{CIR}$(k)=1 && flag$^{CQI}$(k)=1, that is, when the channel correlation indication value is not equal to the first channel correlation indication value, the channel variation state indication value is equal to the first channel variation state indication value, and the channel condition indication value is equal to the first channel condition indication value, the downlink transmission mode 3 is selected.)

When flag$^{RI}$(k)≠1 && flag$^{CIR}$(k)=0 && flag$^{CQI}$(k)=1, that is, when the channel correlation indication value is not equal to the first channel correlation indication value, the channel variation state indication value is equal to the second channel variation state indication value, and the channel condition indication value is equal to the first channel condition indication value, the downlink transmission mode 4 is selected.

S28: data is transmitted to the UE in the selected downlink transmission mode.

In the embodiment 2, the order is not restricted among S20, S22 and S24, no matter which indication value is generated first, a subsequent selection of the downlink transmission mode and transmission of data can be executed.

Figure 4:
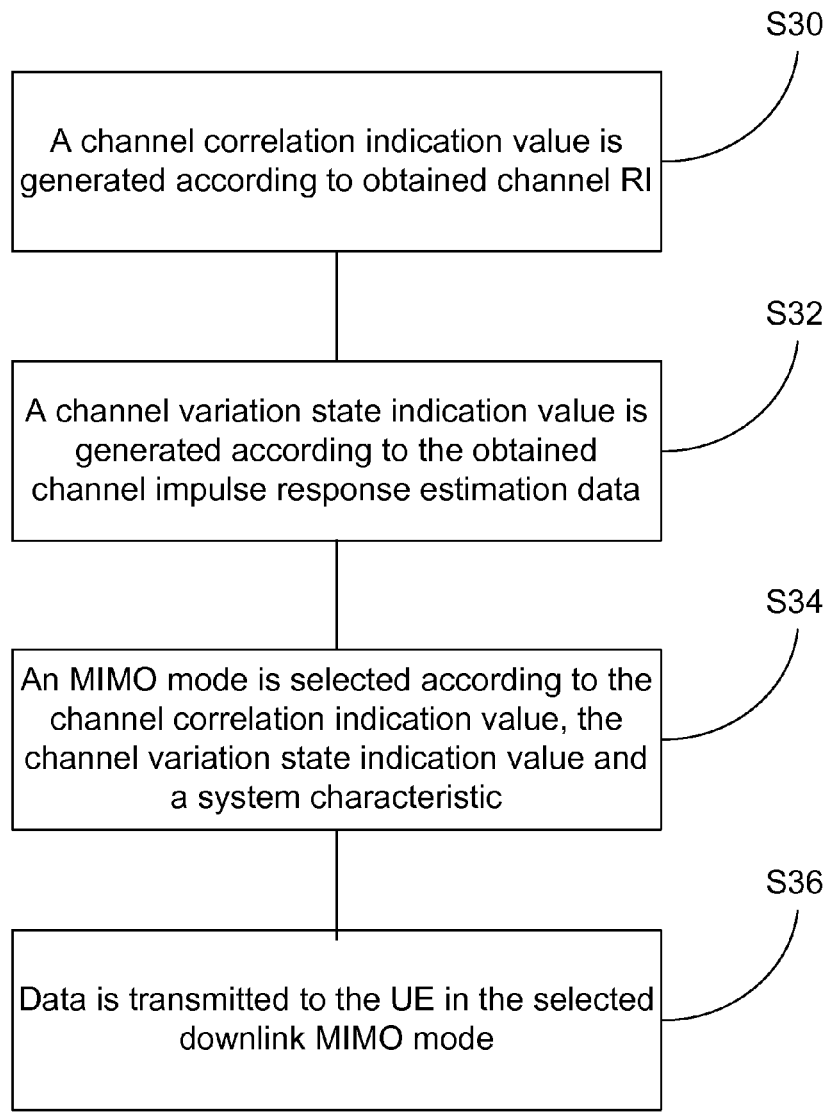
FIG. 4 shows a flow diagram of embodiment 3.

The foregoing embodiment 2 describes the process of selecting the corresponding downlink transmission mode according to the channel condition indication value flag$^{CQI}$, the channel correlation indication value flag$^{RI}$ and the channel variation state indication value flag$^{CIR}$. The selection further can be performed through an LTE system, which will be described in conjunction with embodiment 3; with reference to a flow diagram of the embodiment 3 as shown in FIG. 4, the process includes the following steps.

S30: a channel correlation indication value is generated according to obtained channel RI.

The process of generation of the channel correlation indication value flag$^{RI}$ can refer to S22 in the embodiment 2, which will not be described again herein.

S32: a channel variation state indication value is generated according to the obtained channel impulse response estimation data.

The process of generation of the channel variation state indication value flag$^{CIR}$ can refer to S24 in the embodiment 2, which will not be described again herein.

S34: a transmission mode is selected according to the channel correlation indication value flag$^{RI}$, the channel variation state indication value flag$^{CIR}$ and a system characteristic.

As different systems have a different characteristic, such as multiple-access, multiplexing, operating mode and the like, if the system is an LTE system, the LTE system includes a Long Term Evolution-Time Division Duplex (LTE-TDD) system and a Long Term Evolution-Frequency Division Duplex (LTE-FDD) system.

For an LTE-TDD system:

when flag$^{RI}$(k)=1 && flag$^{CIR}$(k)=0 && LTE-TDD system, that is, if the current system is the LTE-TDD system, the channel correlation indication value flag$^{RI}$ is equal to the first channel correlation indication value, and the channel variation state indication value flag$^{CIR}$ is equal to the second channel correlation indication value, the downlink transmission mode 7 is selected.

For an LTE-FDD System:

when flag$^{RI}$(k)=1 && flag$^{CIR}$(k)=0 && LTE-FDD system, that is, when the channel correlation indication value flag$^{RI}$ is equal to the first channel correlation indication value, and the channel variation state indication value flag$^{CIR}$ is equal to the second channel correlation indication value, the downlink transmission mode 5 or 6 is selected.

For the transmission mode 5 and the transmission mode 6, it may be judged whether there is another UE meeting a downlink MU-MIMO matching criterion like the k-th UE, if there is such a UE, the transmission mode 5 is selected; otherwise, the transmission mode 6 is selected.

S36: data is transmitted to the UE in the selected downlink transmission mode.

In all embodiments, a selection is performed from the transmission mode 3 to the transmission mode 7 through obtaining a wireless channel parameter of a UE, or a wireless channel parameter and a system characteristic; preferably, after a system is started, if an eNodeB of the system has a single antenna, the transmission mode 1 can be selected to transmit data to the UE; if the system has multiple antennas, after the system is started initially, the transmission mode 2 can be selected to transmit data to the UE, furthermore, the selection may be performed from the transmission mode 3 to the transmission mode 7 according to an obtained UE parameter, and then data may be transmitted to the UE in the selected transmission mode.

Figure 5:
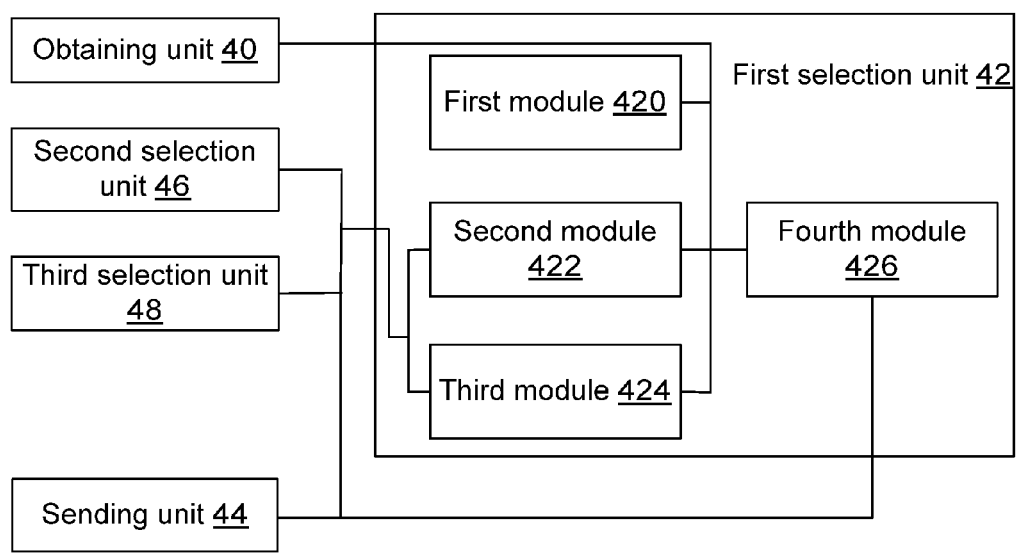
FIG. 5 shows a block diagram of an eNodeB in embodiment 4.

The foregoing embodiments are embodiments of the method in the disclosure, the method in the disclosure may be applied in an eNodeB, and the solutions in the embodiments of the method in the disclosure may be used to achieve that a selected transmission mode is adopted to transmit data. The eNodeB of the disclosure will be described in details in conjunction with embodiment 4 hereinafter. With reference to a structure diagram of the embodiment 4 as shown in FIG. 5, the eNodeB includes:

an obtaining unit 40, configured to obtain CQI, channel RI and CIR estimation data of a UE;

a first selection unit 42, configured to select a downlink transmission mode according to the obtained information; and a sending unit 44, configured to transmit data to the UE in the selected downlink transmission mode.

Preferably, the first selection unit 42 includes:

a first module 420, configured to obtain the CQI of the UE to generate a channel condition indication value;

a second module 422, configured to obtain the channel RI of the UE to generate a channel correlation indication value;

a third module 424, configured to obtain the CIR estimation data of the UE to generate a channel variation state indication value; and a fourth module 426, configured to select the downlink transmission mode according to the channel condition indication value, the channel correlation indication value and the channel variation state indication value.

Preferably, the eNodeB further includes:

a second selection unit 46, configured to, when identifying that the eNodeB belongs to an LTE-TDD system, select the downlink transmission mode according to the channel correlation indication value and the channel variation state indication value in the first selection unit 42.

Preferably, the eNodeB further includes:

a third selection unit 78, configured to, when identifying that the eNodeB belongs to an LTE-FDD system, select the downlink transmission mode according to the channel correlation indication value and the channel variation state indication value in the first selection unit 42, and also according to whether there are two UE meeting the MU-MIMO criterion in the system.

It can be seen from the above description that, the above embodiments of the disclosure achieve the following technical effects that:

1. CQI, channel RI and CIR estimation data of a UE are utilized to generate the corresponding indication values, and a downlink transmission mode is selected according to the indication values, such that a bandwidth and a resource utilization ratio of a system are increased;

2. a downlink transmission mode is selected according to the channel RI, the CIR and a TDD characteristic of a system, such that the bandwidth and the resource utilization ratio of the system are increased; and 3. a downlink transmission mode is selected according to RI, CIR and an FDD characteristic of a system and a MU-MIMO criterion, such that a bandwidth and a resource utilization ratio of the system are increased.

Obviously, those skilled in the art should understand that, the above modules or steps of the disclosure could be realized through a general calculating device, they can be concentrated in a single calculating device or distributed in a network formed by multiple calculating devices; optionally, they can be realized by a program code that can be executed by a calculating device, such that they can be stored in a storage device to be executed by a calculating device, or they can be achieved by respectively making them into many integrated circuit modules or by making multiple modules or steps among them into a single integrated circuit module. In this way, the disclosure is not limited to a combination of any specific hardware and software.

The above are only the preferred embodiments of the disclosure and are not intended to limit the disclosure; for those skilled in the art, the disclosure may have various modifications and changes. Any modification, equivalent replacement and improvement made within the spirit and principle of the disclosure should be included within the scope of protection of the disclosure.

The invention claimed is:

1. A downlink transmission method in a Multiple Input Multiple Output (MIMO) system, comprising:
    obtaining Channel Quality Indication (COI) of a User Equipment (UE) to generate a channel condition indication value;
    obtaining channel Rank Indication (RI) of the UE to generate a channel correlation indication value;
    obtaining uplink Channel Impulse Response (CIR) estimation data of the UE to generate a channel variation state indication value;
    selecting by an eNobeB in a Multiple Input Mutilple Output (MIMO) system, a downlink transmission mode according to the channel condition indication value, the channel correlation indication value and the channel variation state indication value; and
    transmitting data to the UE in the selected downlink transmission mode.

2. The downlink transmission method according to claim 1, wherein the obtaining the channel RI of the UE to generate the channel correlation indication value comprises:
    collecting, within a preset time, the channel RI from the UE in a wireless channel;
    obtaining, through the RI, a probability $P^k_{RI=1}$ that RI is equal to 1 and a probability $P^k_{RI\geq 2}$ that RI is greater than or equal to 2;
    when the obtained probability $P^k_{RI=1}$ is greater than a preset threshold RI_Thr, generating a first channel correlation indication value; and
    when the obtained probability $P^k_{RI\geq 2}$ is greater than the preset threshold RI_Thr, generating a second channel correlation indication value.

3. The downlink transmission method according to claim 2, wherein the generating the channel variation state indication value comprises:
    performing a smoothing filtering by calculating an instant correlation value $R_H(k)$ of two time slots t1 and t2 for the K-th UE and a recorded correlation value $\bar{R}_k$ of uplink adjacent time slot channel estimation data for the K-th UE, to obtain an updated correlation value $\bar{R}$;
    obtaining the correlation value $\bar{R}$ through a formula $\bar{R}=(1-\alpha)\bar{R}_k+\alpha R_H(k)$, wherein $\alpha$ is the smoothing filtering factor and $\alpha$ is greater than 0 and less than or equal to 1, and $\bar{R}_k$ is a recorded correlation value of uplink adjacent time slot channel estimation data for a K-th UE;
    judging whether the updated correlation value $\bar{R}$ is greater than a preset threshold CIR_Thr;
    if the updated correlation value $\bar{R}$ is less than or equal to the preset threshold CIR_Thr, generating a first channel variation state indication value; and
    if the updated correlation value $\bar{R}$ is greater than the preset threshold CIR_Thr, generating a second channel variation state indication value.

4. The downlink transmission method according to claim 3, wherein the instant correlation value $R_H(k)$ at the two time slots t1 and t2 is obtained through performing correlation calculations on uplink channel impulse response estimation data $H_{t1}$ and $H_{t2}$ within the time slots t1 and t2;
    wherein, the time interval between the time slots t1 and t2 is less than a preset time window $T_{up}$, and $H_{t1}$ and $H_{t2}$ are an uplink channel impulse response estimation data matrix $H_t^{(k)}{}_{Ka\times L}$ within the time slots t1 and t2 for the K-th UE within a preset time T:

$$H_{t\,Ka\times L}^{(k)} = \begin{bmatrix} h_1^{(k,1)}(t) & h_2^{(k,1)}(t) & \cdots & h_L^{(k,1)}(t) \\ h_1^{(k,2)}(t) & h_2^{(k,2)}(t) & \cdots & h_L^{(k,2)}(t) \\ \vdots & \vdots & \ddots & \vdots \\ h_1^{(k,Ka)}(t) & h_2^{(k,Ka)}(t) & \cdots & h_L^{(k,Ka)}(t) \end{bmatrix}_{Ka\times L}$$

where, Ka is a number of antennas in an eNodeB array, L is a number of a Resource Elements (RE) occupied by the k-th UE within an LTE system bandwidth, and $h_L$ is the uplink channel impulse response estimation data;
    a correlation calculation is performed by using the following formula to get the instant correlation value $R_H(k)$:

$$R_H(k) = \frac{1}{L'}\sum_{i=1}^{L'} \left| \frac{\sum_{ka=1}^{Ka} h_i^{(k,ka)}(t1).*conj\left(h_i^{(k,ka)}(t2)\right)}{\sqrt{\sum_{ka=1}^{Ka} |h_i^{(k,ka)}(t1)|^2 * \sum_{ka=1}^{Ka} |h_i^{(k,ka)}(t2)|^2}} \right|$$

wherein the time interval between the time slots t1 and t2 is less than or equal to a time length of the preset time window, $h_i$ is the uplink channel impulse response estimation data with i=1, 2, . . . , L', and L' is the number of the REs occupied by the k-th user in a same frequency domain location in different time slots, and $1\leq L'\leq L$;
    or, when L'=0, the instant correlation value $R_H(k)$ is equal to the recorded correlation value $\bar{R}_k$ of the uplink adjacent time slot channel estimation data for the k-th UE.

5. The downlink transmission method according to claim 3, wherein the generating the channel condition indication value comprises:
    obtaining total M groups of the CQIs from the UE for M times, wherein M is an integer greater than 0;
    obtaining a minimum CQI in each group;
    obtaining a mean value CQI of corresponding M minimum CQIs for M times;
    judging whether the mean value CQI is greater than a preset threshold CQI_Thr;
    if the mean value CQI is greater than the preset threshold CQI_Thr, generating a first channel condition indication value; and
    if the mean value CQI is less than or equal to the preset threshold CQI_Thr, generating a second channel condition indication value.

6. The downlink transmission method according to claim 5, wherein the selecting the downlink transmission mode according to the channel condition indication value, the channel correlation indication value and the channel variation state indication value comprises one of the following steps:
    when the channel condition indication value is equal to the first channel condition indication value, the channel correlation indication value is not equal to the first channel correlation indication value, and the channel variation state indication value is equal to the first channel variation state indication value, selecting downlink transmission mode 3; and
    when the channel condition indication value is equal to the first channel condition indication value, the channel correlation indication value is not equal to the first channel correlation indication value, and the channel variation state indication value is equal to the second channel variation state indication value, selecting downlink transmission mode 4.

7. The downlink transmission method according to claim 3, further comprising:
   before selecting the downlink transmission mode according to the channel condition indication value, the channel correlation indication value and the channel variation state indication value, determining that the system is a Long Term Evolution-Time Division Duplex (LTE-TDD) system;
   the selecting the downlink transmission mode according to the channel condition indication value, the channel correlation indication value and the channel variation state indication value comprises:
   when the channel correlation indication value is equal to the first channel correlation indication value, and the channel variation state indication value is equal to the second channel variation state indication value, selecting downlink transmission mode 7.

8. The downlink transmission method according to claim 3, further comprising:
   before selecting the downlink transmission mode according to the channel condition indication value, the channel correlation indication value and the channel variation state indication value, determining that the system is an Long Term Evolution-Frequency Division Duplex (LTE-FDD) system and there are two UE meeting a Downlink Multiple-User Multiple Input Multiple Output (MU-MIMO) matching criterion in the system;
   the selecting the downlink transmission mode according to the channel condition indication value, the channel correlation indication value and the channel variation state indication value comprises:
   when the channel correlation indication value is equal to the first channel correlation indication value, and the channel variation state indication value is equal to the second channel variation state indication value, selecting downlink transmission mode 5.

9. The downlink transmission method according to claim 3, further comprising:
   before selecting the downlink transmission mode according to the channel condition indication value, the channel correlation indication value and the channel variation state indication value, determining that the system is an LTE-FDD system and there are no two UE meeting the downlink MU-MIMO matching criterion in the system;
   the selecting the downlink transmission mode according to the channel condition indication value, the channel correlation indication value and the channel variation state indication value comprises:
   when the channel correlation indication value is equal to the first channel correlation indication value, and the channel variation state indication value is equal to the second channel variation state indication value, selecting downlink transmission mode 6.

10. An eNodeB in a Multiple Input Multiple Output (MIMO) system, comprising:
    an obtaining unit, configured to obtain Channel Quality Indication (CQI), channel Rank Indication (RI) and uplink Channel Impulse Response (CIR) estimation data of a User Equipment (UE);
    a first selection unit, comprising:
    a first module, configured to obtain the CQI of UE to generate a channel condition indication value;
    a second module, configured to obtain the channel RI of the UE to generate a channel correlation indication value;
    a third module, configured to obtain the CIR estimation data of the UE to generate a channel variation state indication value; and
    a fourth module, configured to select the downlink transmission mode according to the channel condition indication value, the channel correlation indication value and the channel variation state indication value; and
    a sending unit, configured to transmit data to the UE in the selected downlink transmission mode.

11. The eNodeB according to claim 10, further comprising:
    a second selection unit, configured to, when identifying that the eNodeB belongs to a Long Term Evolution-Time Division Duplex (LTE-TDD) system, select the downlink transmission mode according to the channel correlation indication value and the channel variation state indication value in the first selection unit.

12. The eNodeB according to claim 11, further comprising:
    a third selection unit, configured to, when identifying that an eNodeB belongs to an LTE-FDD system, selecting the downlink transmission mode according to the channel correlation indication value and the channel variation state indication value in the first selection unit, and also according to whether there are two UE meeting a Downlink Multiple-User Multiple Input Multiple Output (MU-MIMO) criterion in the system.

* * * * *